Oct. 5, 1965 K. KRZEMICKI 3,210,399
METHOD OF PREPARING ACRYLONITRILE FREE FROM ACETONITRILE
Filed April 2, 1962
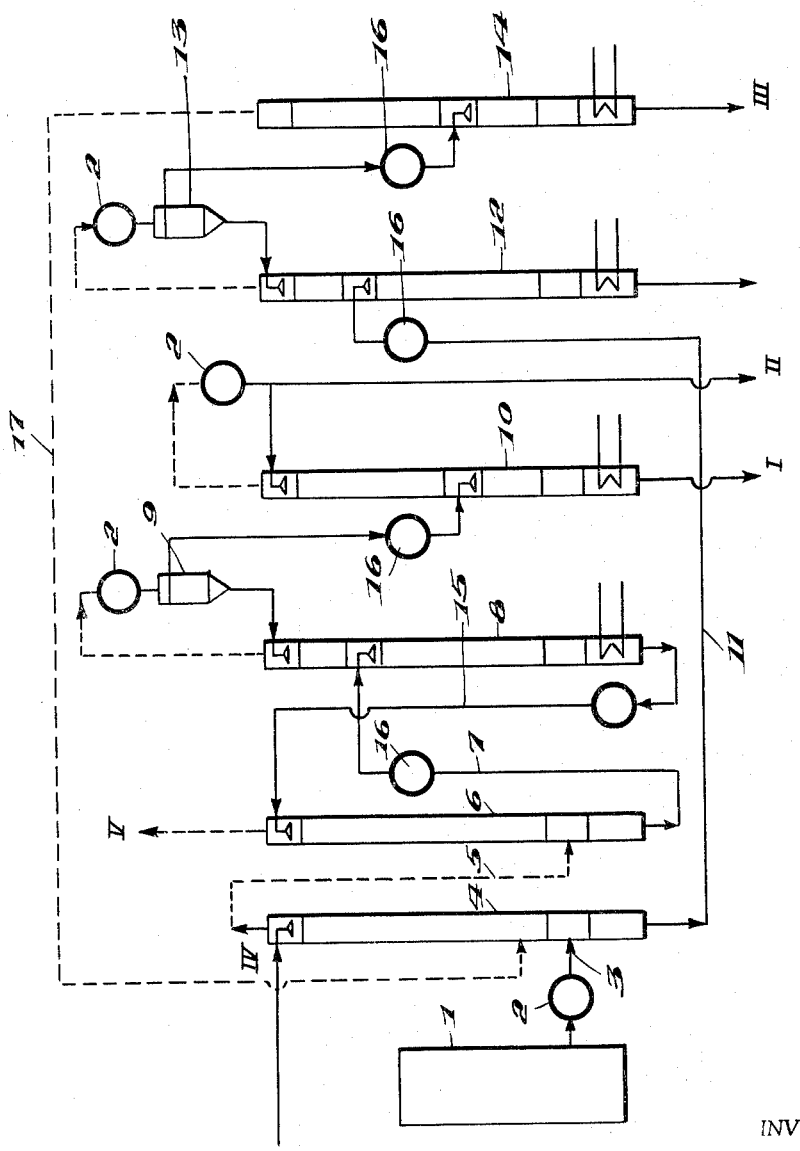
INVENTOR
KASIMIR KRZEMICKI,
BY *Bailey, Stephens & Huettig*
ATTORNEYS 3,210,399
METHOD OF PREPARING ACRYLONITRILE FREE FROM ACETONITRILE
Kasimir Krzemicki, Linz, Austria, assignor to Osterreichische Stickstoffwerke Aktiengesellschaft, Linz, Austria
Filed Apr. 2, 1962, Ser. No. 184,372
Claims priority, application Austria, Apr. 8, 1961, A 2,833/61
4 Claims. (Cl. 260—465.3)

This invention relates to a method for the preparation of acrylonitrile free from acetonitrile.

The synthesis of acrylonitrile by various methods, such as, for example, the reaction of hydrocyanic acid with acetylene, the dehydrogenation of propionitrile, the reaction of propylene with ammonia and oxygen, or the reaction of acrolein with ammonia, usually results in an acrylonitrile containing acetonitrile as an impurity. Thus, for example, in the catalytic reaction of propylene with ammonia and atmospheric oxygen, the gas mixture resulting immediately after the synthesis contains not only the desired product, acrylonitrile, but also a considerable quantity of starting materials and nitrogen, and also acetonitrile and hydrocyanic acid as the main by-products. Hitherto, in order to extract the acrylonitrile from this gas mixture, the water-soluble constituents were usually separated from the large quantity of water-insoluble gases by washing with a considerable excess of water in counter-current, whereupon the nitriles and hydrocyanic acid were separated from the resultant aqueous solution, which contains particularly acrylonitrile, acetonitrile, and hydrocyanic acid, possibly together with small quantities of ammonia and carbon dioxide, and the nitrile mixture was then separated by distillation.

Although the separation of the hydrocyanic acid does not cause any difficulty, owing to its volatility, separation of the two nitriles by distillation is very difficult and requires considerable expenditure, since the difference between the boiling points of acetonitrile (81° C.) and acrylonitrile (78° C.) is only 3° C. Somewhat better results are obtained by fractional distillation of the two nitriles with water, but here again the boiling point difference of 3° C. is inadequate to give satisfactory purity of the acrylonitrile in practice.

It has also been proposed to utilize the higher volatility of the acrylonitrile with steam in order to separate the two nitriles. During the distillation of the azetropes of the two nitriles in a column, a current of hot water is introduced just below the head of the column so that the azeotrope of acrylonitrile is obtained as head product, while a solution of acetonitrile collects at the bottom. In an alternative form of this process alkali salts are added to the water. However, in all of these processes it is not possible to avoid the use of an expensive distillation column.

The necessity for using a tall expensive distillation column has now been avoided by the present invention which provides a method of preparing acrylonitrile free from acetonitrile from a gas mixture containing acetonitrile, water-insoluble gases as main constituent together with acrylonitrile, by extraction of the water-soluble nitriles with water, which method comprises subjecting the gas mixture, containing a maximum of 20 parts by weight of acetonitrile with respect to 100 parts of acrylonitrile, to a partial counter-current extraction with water at atmospheric pressure and at a temperature of 10° to 60° C., preferably 20° to 40° C., the amount of water used for extraction being such as not to exceed and preferably to fall below the quantity of water derived from the equation:

$$X = \frac{T}{2} + 3$$

where X is the quantity of water in parts by weight per part by weight of acrylonitrile and T is the absorption temperature in degrees C., and isolating the acrylonitrile from the acetotnitrile-free gas mixture.

It has been found that the acetonitrile can be completely eliminated from the gas mixture from the synthesis furnace, even before the acrylonitrile is separated, provided that this gas mixture is subjected to a pre-wash at atmospheric pressure and a temperature of 10° to 60° C. preferably 20° to 40° C., before the conventional separating operations are performed, the pre-wash being effected with a quantity of water, as defined above, such that all the acetonitrile contained in the gas mixture is absorbed therein, while the main quantity of acrylonitrile remains unabsorbed and flows off in the form of a gas together with the other gases. This acrylonitrile not absorbed in the pre-wash can then be recovered in the usual way as a product completely free from acetonitrile.

The exact choice of the quantity of water within the limits according to the invention depends on a number of factors. Apart from the temperature, the acetonitrile content of the gas and the efficiency of the column used for extraction are governing factors. The more efficient the column, the smaller the quantity of water required. In practice, a bubble tray column having at least five practicle trays, but preferably 12 to 20 practical trays, has proved particularly advantageous. Instead of a bubble tray column it is of course possible to use any other known extraction apparatus of an efficiency corresponding to such a bubble tray column.

The pre-wash according to the invention has the effect that the entire acetonitrile and some of the acrylonitrile present, namely 15% to 25%, are obtained as an aqueous solution from the extraction apparatus. The head product escapes in the form of a gas mixture which is completely free from acetonitrile and which in addition to the inert gases and possibly hydrocyanic acid contains 75% to 85% of the original acrylonitrile content. The acrylonitrile is then separated in the usual manner. Thus, for example, all the acrylonitrile and any hydrocyanic acid present can be extracted from the gas mixture in a further extraction stage by washing with excess water. The crude acrylonitrile can then be separated in the usual way, for example, with steam, from the aqueous crude acrylonitrile solution accumulating in this further extraction stage, and any hydrocyanic acid still present as an impurity and boiling at 25° C. can then be eliminated in a simple distillation column. The resultant water-saturated acrylonitrile can then be dried in the usual way by azeotropic distillation and is obtained in a very pure state. Other conventional methods, for example, condensing out the acrylonitrile, or liquid-liquid extraction, can be used equally well for the separation of the acryonitrile.

The aqueous solution of acetonitrile and some acrylonitrile accumulating during the pre-wash can be processed in the usual way by separating the nitriles from the solution and separating the two nitriles by distillation. This latter separation requires a very tall column but this disadvantage can be obviated according to the present invention if the acetonitrile-acrylonitrile mixture obtained from the aqueous solution of the pre-wash is not completely separated into acetonitrile and acrylonitrile, but instead there is extracted from the mixture only an amount of acetonitrile such as to leave an acetonitrile-acrylonitrile mixture, the acetonitrile content of which with respect to acrylonitrile does not completely equal that of the starting gas for the method according to the invention. This mixture can be fed to the pre-washer, with some water if required, and hence cycled. The expenditure for this just partial separation of the acetonitrile is naturally much less than that required for complete separation by distillation.

If the gas leaving the furnace contains relatively large quantities of ammonia, it may be advantageous to eliminate the ammonia before the separating operation according to the invention and this elimination may be performed in known manner, for example, by means of an acid wash.

The method according to the invention may be performed in the apparatus illustrated in the accompanying drawing, wherein a synthesis apparatus 1 is connected to the base of a bubble tray column 4 by way of a cooler 2 and a pipe 3. Water is fed to the column 4 at the point IV. The head product is fed into a packed column 6 by way of a pipe 5. This column receives wash water through a pipe 15, and has a waste gas outlet V. The column 6 is connected by a pipe 7 to a separator 8. The distillate from the separator passes through a cooler 2 to a decanter 9, where it is separated into two layers. The bottom layer returns to the separator 8 and the top layer is fed through a pre-heater 16 to a distillation column 10 for the separation of the hydrocyanic acid. Pure water-saturated acrylonitrile emerges at I, while hydrocyanic acid is obtained at II. The base of the column 4 is connected by a pipe 11 and a pre-heater 16 to a separator 12. A decanter 13 separates the distillates from separator 12 into two layers and the top layer is fed through a pre-heater 16 to a distillation column 14 for separation into acetonitrile and acetonitrile-acrylonitrile mixture. Acetonitrile emerges at III, while the acrylonitrile-acetonitrile mixture is returned from the head of the column 14 to the bottom of the column 4 through a heated pipe 17.

The following examples illustrate the invention:

*Example 1*

A stream of gas of about 70 normal liters per hour containing 6.8 g. acrylonitrile per hour 0.4 g. acetonitrile per hour and 0.450 g. hydrocyanic acid per hour is cooled to room temperature in the cooler 2 illustrated in the accompanying drawing contained in the pipe 3 and is introduced into the bubble tray column 4 which contains 15 practical trays, and which is sprinkled with 70 ml. water per hour at a temperature of 25° C. from IV. The quantity of water corresponds to 10.5 parts by weight of water per part by weight of acrylonitrile. The waste gas from this column is fed through the pipe 5 to the packed column 6, which is sprinkled with 700 ml. of water per hour through the pipe 15. The solution flowing out of this column is fed to the separator 8 through the pipe 7 and a pre-heater 16. The distillate from this separator separates into two layers in the decanter 9. The bottom layer, consisting of water saturated with acrylonitrile, is returned to the separator 8. The top layer, consisting of acrylonitrile saturated with water and still containing hydrocyanic acid as impurity, is fed to the distillation column 10 through a pre-heater 16. With continuous operation, 0.450 g. of hydrocyanic acid per hour is obtained at the head of the column, and 6.95 g. of acrylonitrile having a water content of about 0.2 g. are obtained at the bottom of the column. The acrylonitrile is drawn off in vapour form and condensed. It can be further purified by azeotropic distillation.

The solution flowing out of the column 4 is introduced into the separator 12. In the next decanter 13 there is obtained an acetonitrile-acrylonitrile mixture which is fed through a pre-heater 16 to the distillation column 14. At the bottom of the column 0.395 g. of acetonitrile is obtained per hour, this acetonitrile containing less than 0.5% of water, less than 20 p.p.m. hydrocyanic acid and less than 0.1% of acrylonitrile.

The acrylonitrile-acetonitrile mixture which accumulates at the top of the column and which has an acrylonitrile content of about 1.6 g. per hour and an acetonitrile content of about 0.050 g. per hour is returned through the heated pipe 17 and fed into the bottom quarter of the column 4.

*Example 2*

A stream of gas consisting of 50 normal liters nitrogen per hour, 7.3 g. acrylonitrile per hour, 0.320 g. acetonitrile per hour and 0.320 g. steam per hour is washed in countercurrent at atmospheric pressure and a temperature of 20° C. in a bubble tray column containing 12 practical trays with 50 ml. of water per hour (6.8 parts by weight of water to 1 part by weight of acrylonitrile). The gas mixture leaving the bubble tray column is cooled to −80° C. in a cooling trap, the acrylonitrile and water condensing out. This results in 5 g. acrylonitrile per hour having an acetonitrile content of less than 0.1%. The washwater accumulating at the bottom of the column contains 2.3 g. of acrylonitrile and 0.318 g. of acetonitrile which are isolated therefrom in the usual way.

*Example 3*

The same gas mixture as in Example 2 is washed in counter-current at atmospheric pressure and a temperature of 40° C. in a bubble tray column containing 12 practical trays with 100 ml. of water per hour (13.7 parts by weight of water to 1 part by weight of acrylonitrile). After the acrylonitrile had been condensed out as in Example 2, 4.9 g. of acrylonitrile per hour are obtained with an acetonitrile content of less than 0.1%. The wash water contains 2.4 g. of acrylonitrile and 0.318 g. of acetonitrile.

I claim:

1. A method of separating acetonitrile from a gas mixture produced in the synthesis of acrylonitrile by reaction of propylene with ammonia and oxygen, such gas mixture containing water insoluble gases as main constituent and as a maximum containing 20 parts by weight of acetonitrile per 100 parts by weight of acrylonitrile which comprises subjecting such gas mixture produced in the synthesis to a wash with water at atmospheric pressure and a temperature of 10° to 60° C. in a countercurrent extraction column, the quantity of water employed for such wash being sufficient to absorb all of the acetonitrile contained in the gas mixture during such wash and not being in excess of that derived from the equation:

$$X = \frac{T}{2} + 3$$

wherein X is the quantity of water in parts by weight per part by weight of acrylonitrile in the gas mixture and T is the absorption temperature employed in the wash in degrees C. and recovering the acrylonitrile from the gas mixture thus freed from acetonitrile.

2. The method of claim 1 in which said said wash is carried out at a temperature between 20 and 40° C. in a bubble tray column containing more than 4 practical trays.

3. The method of claim 2 in which said bubble tray column contains 12 to 20 practical trays.

4. A method of separating acetonitrile from a gas mixture produced in the synthesis of acrylonitrile by reaction of propylene with ammonia and oxygen, such gas mixture containing water insoluble gases as main constituent and as a maximum containing 20 parts by weight of acetonitrile per 100 parts by weight of acryonitrile which comprises subjecting such gas mixture produced in the synthesis to a wash with water at atmospheric pressure and a temperature of 10° to 60° C. in a countercurrent extraction column, the quantity of water employed for such wash being sufficient to absorb all of the acetonitrile contained in the gas mixture during such wash and not being in excess of that derived from the equation:

$$X = \frac{T}{2} + 3$$

wherein X is the quantity of water in parts by weight per part by weight of acrylonitrile in the gas mixture and T is the absorption temperature employed in the wash in degrees X, recovering the acrylonitrile from the gas mixture thus freed from acetonitrile, separating a mixture of acetonitrile and acrylonitrile from the aqueous solution accumulating at the bottom of the extraction column, distilling such nitrile mixture to separate it into acetonitrile and an acrylonitrile-acetonitrile mixture containing a lower proportion of acetonitrile with respect to the acrylonitrile than in the starting gas mixture and recycling said acrylonitrile-acetonitrile mixture to the countercurrent extraction column.

References Cited by the Examiner

UNITED STATES PATENTS

| | | | |
|---|---|---|---|
| 2,415,662 | 2/47 | Teter et al. | 202—42 |
| 2,681,306 | 6/54 | Kemp et al. | 260—465.9 X |
| 2,773,088 | 12/56 | Maslan | 260—465.9 X |

CHARLES B. PARKER, *Primary Examiner.*

JOSEPH P. BRUST, *Examiner.*